May 17, 1966    Z. O. KARAKASHJAN ETAL    3,251,481
HYDROSPRING ABSORBING DEVICE
Filed Jan. 23, 1963    4 Sheets-Sheet 1
Fig. 1.
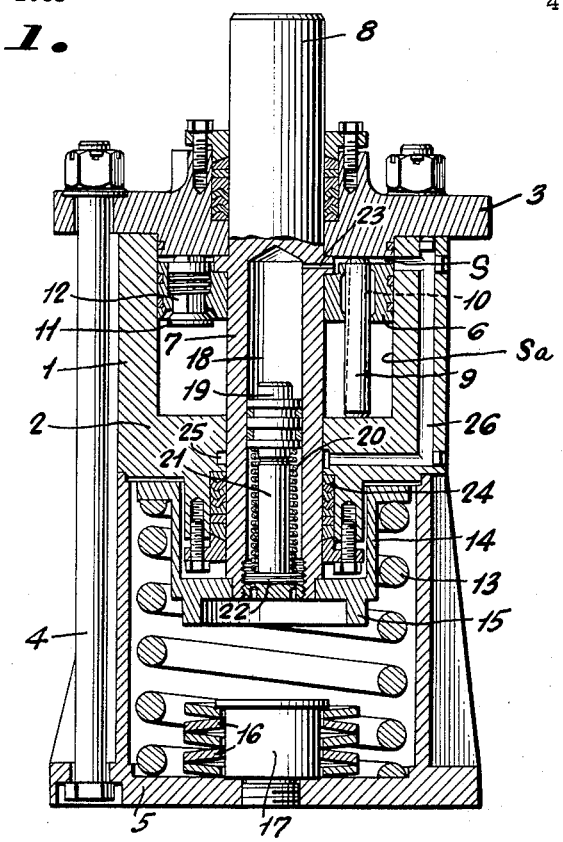
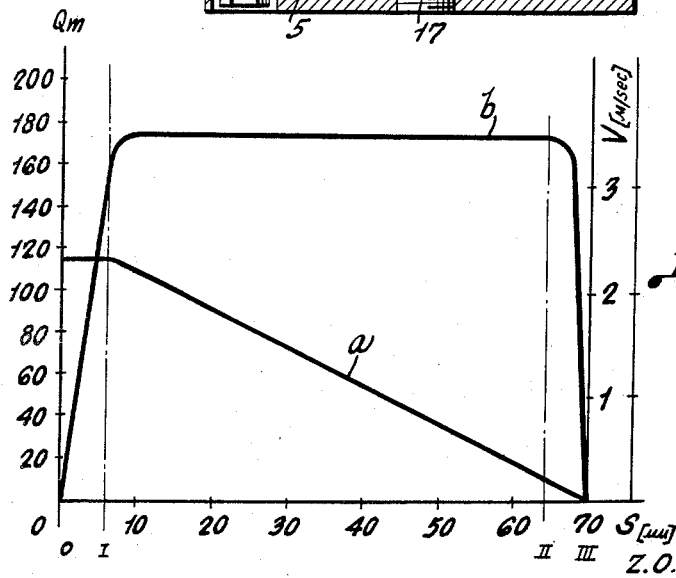
Fig. 11.
INVENTORS
Z. O. KARAKASHJAN
S. N. FATEEV
A. M. VORONTSOV
A. I. CHERNYSHEV
BY Glascock, Downing & Seebold
ATTORNEYS

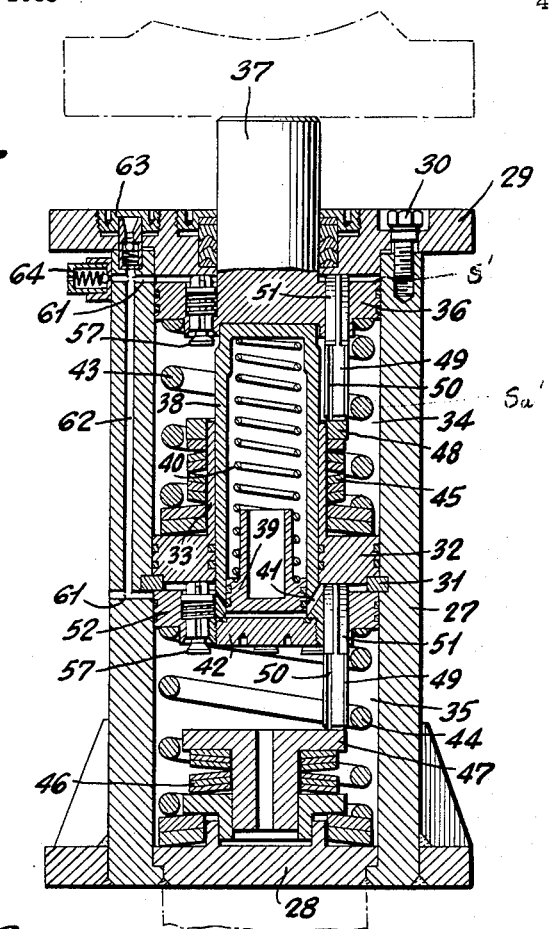
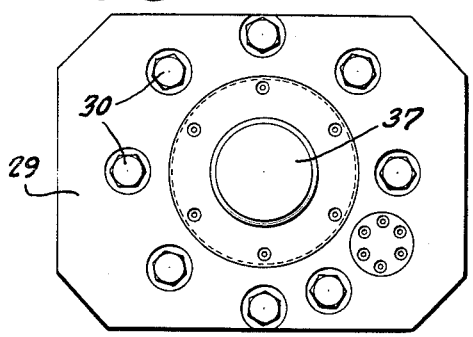
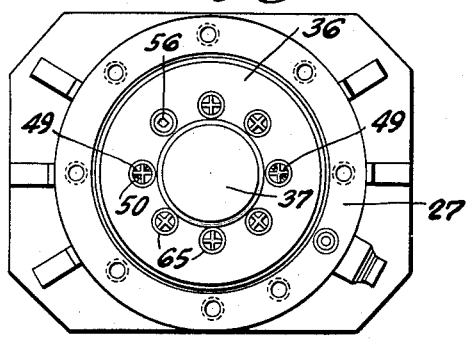
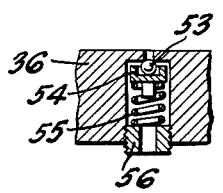

May 17, 1966  Z. O. KARAKASHJAN ETAL  3,251,481
HYDROSPRING ABSORBING DEVICE
Filed Jan. 23, 1963  4 Sheets-Sheet 3
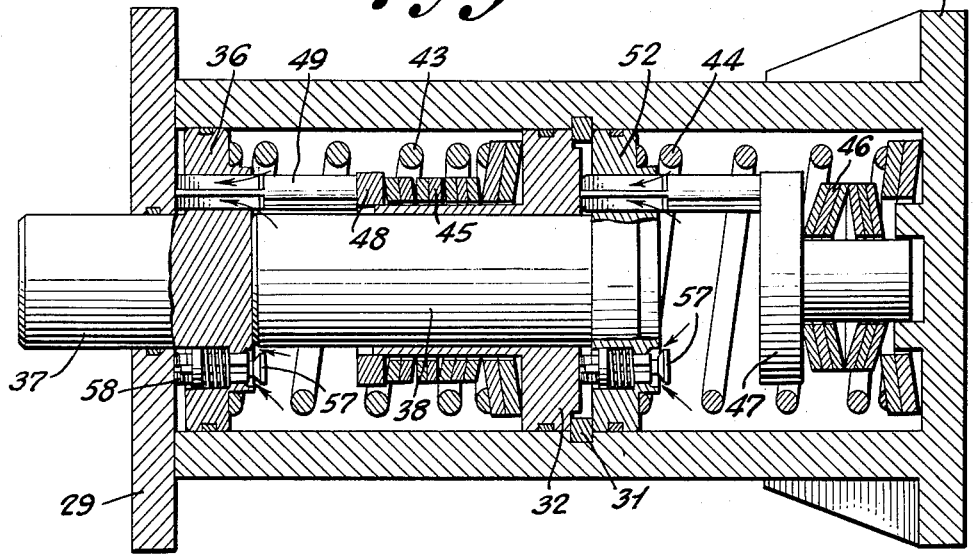
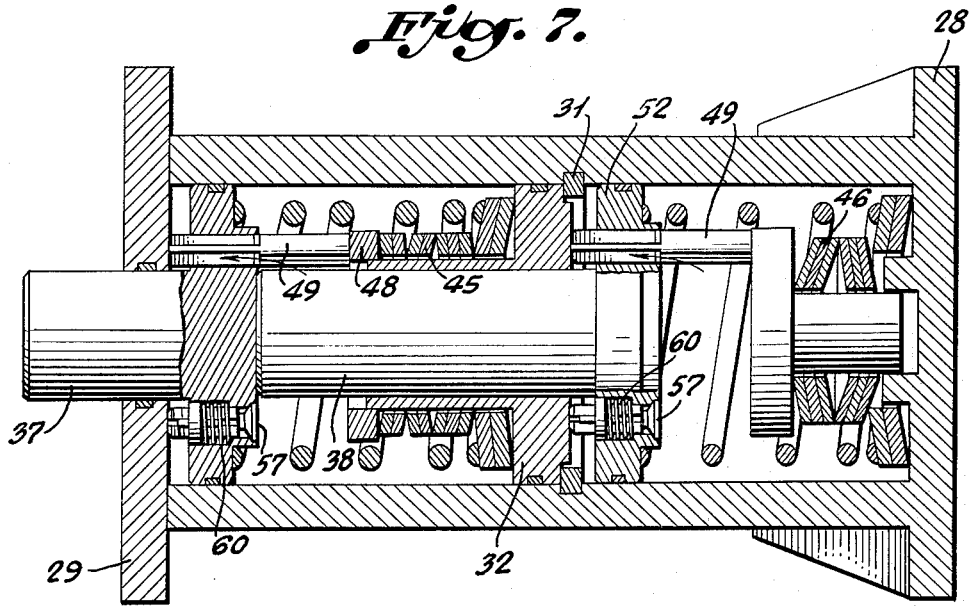
INVENTORS
Z. O. KARAKASHJAN
S. N. FATEEV
A. M. VORONTSOV
A. I. CHERNYSHEV
BY
ATTORNEYS May 17, 1966    Z. O. KARAKASHJAN ETAL    3,251,481
HYDROSPRING ABSORBING DEVICE
Filed Jan. 23, 1963              4 Sheets-Sheet 4

INVENTORS
Z. O. KARAKASHJAN
S. N. FATEEV
A. M. VORONTSOV
A. I. CHERNYSHEV
BY
ATTORNEYS

United States Patent Office 3,251,481
Patented May 17, 1966

3,251,481
HYDROSPRING ABSORBING DEVICE
Zaven Oganezovich Karakashjan, Dobroljubov Str. 18, Appt. 46; Sergey Nickolaevich Fateev, Chaikovsky Str. 8; Appt. 31, Kaliningrad; Alexander Mikhailovich Vorontsov, Bolshoy Rzhevsky by-street 10, Appt. 3; and Andrey Ivanovich Chernyshev, 3–d Kozhukhovskaja Str. 91/20, Appt. 22, all of Moscow, U.S.S.R.
Filed Jan. 23, 1963, Ser. No. 273,800
8 Claims. (Cl. 213—43)

This invention relates to devices for absorbing the kinetic energy of bodies being in relative motion and more particularly to absorbing devices for automatic couplers for railway rolling stock.

It is known that in the buffers of railway rolling stock hydro-spring absorbing devices are used and the same represent a combination of a hydraulic piston-cylinder assembly having out-flow openings positioned along the forming line of the cylinder while a resilient member of the device, a coiled cylindrical spring, is built into the cylinder body. The disadvantage of this design is the necessity of constructing an additional external reservoir for the effective fluid.

Another design of absorbing device was proposed in which the effective fluid passes through an eccentric opening in the piston and in this situation, a device is provided for changing the dimension of the outflow opening. Such device has the form of a conical plunger pin fixed on the bottom of the cylinder.

However, a considerable disadvantage is characteristic of all known types of hydraulic spring-actuated absorbing devices and this does not permit their use effectively in automatic couplers of railway rolling stock. The shortcoming is that they do not ensure the necessary damping of impact loads occurring when the speed of the locomotive at starting is still low and the hydraulic part of the absorbing device for damping the shocks and impacts caused by jerking of the rolling stock is practically not in action, as at low-speed relative motion of the piston and cylinder the effective fluid flows through the outflow openings. The same process takes place when the rolling stock runs along a long gradient.

Another disadvantage of the known absorbing devices is that for damping the impacts at starting a considerable increase in the dimensions of the outflow openings is required which, in turn, involves an increase in the piston diameter.

Conical plunger pins with a forming line of different configuration fixed on the butt-ends of the cylinder are used in the known devices. This complicates considerably the manufacture of the butt-ends of the cylinder. When a heavy load is abruptly applied, the effective fluid will not have time to run through the outflow openings and as a result thereof the pressure will inadmissibly increase which may cause damage to the device.

The known devices are provided with compensation reservoirs to compensate for the loss of effective fluid which are positioned outside of the hydraulic cylinders. This arrangement complicates the design of the device and increases its overall dimensions.

There is one more disadvantage of the known absorbing devices, namely, the necessity, in the case of heavy loads, of a considerable increase of the working cylinder diameter which is especially undesirable when using the device for automatic couplers.

Attempts have been made to overcome the disadvantages mentioned above but the same did not afford any worthwhile results. We have solved this problem and have provided a practical device for achieving the desired ends.

The present invention eliminates the above mentioned disadvantages and permits the effective use of the hydraulic spring-actuated absorbing device in automatic couplers of railway rolling stock. In accordance with the preferred mode of realization of this invention, the device comprises a body with a hydraulic cylinder provided with a spring-loaded rod or several successively installed cylinders having outflow openings, return valves and a safety valve being provided in the piston.

The object of the present invention is to provide an absorbing assembly capable of taking heavy and comparatively slowly increasing loads.

Another object of this invention is to provide a device for damping the resistance of the device at the beginning of the power stroke.

In addition, a further object of the present invention is to simplify the design of the plunger pins cooperating with the outflow openings of the piston and allow the use of the rod of the latter for positioning the effective fluid reservoir.

It should also be noted that this invention provides for the use of the bore of the piston rod as a compensating reservoir for the effective fluid.

One of the objects of the present invention is to prevent damage to the device caused by a sudden application of a heavy load when pressure in the working cavity of the hydraulic cylinder of the device sharply rises. Another object of the present invention is to decrease the diameter of the cylinder or the overall height and width dimensions of the device which is quite important when the area of the automatic coupler installation is limited.

Further objects and advantages of the invention will become more readily apparent to one skilled in the art from the following detailed description and annexed drawings, in which drawings:

FIG. 1 is a sectional view of one of the embodiments of the absorbing device having one working cylinder.

FIG. 2 is a sectional view of an embodiment of the absorbing device having two working chambers in a cylinder.

FIG. 3 is a top plan view of the absorbing device shown in FIG. 2.

FIG. 4 is a view similar to FIG. 3 with the cover removed.

FIG. 5 is a detailed sectional view of the safety valve.

FIG. 6 is a view partly in section and partly in elevation illustrating diagrammatically the absorbing device of FIG. 2 and more particularly the relationship of the components at the initial power stroke.

FIG. 7 is a view similar to FIG. 6 during the power stroke.

FIG. 11 is a diagrammatic view of the work of the hydraulic component of the device in FIG. 2.

Figure 9:
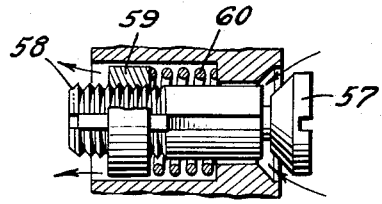
FIG. 9 is an elevational view partly in section showing the position of the return valves at the initial power stroke.

Generally speaking, the absorbing device consists of a hydraulic cylinder having outflow openings, a piston, return valves in the piston, and being equipped with additional resilient members.

The basic part of the absorbing device in FIG. 1 is the hydraulic piston-cylinder assembly comprising a body 1 with a base 2 and detachable cover 3 fixed by means of coupling bolts 4 to a socket member 5. A piston 6 is mounted on rod 7, head 8 of which coacts with the thrust plate of the automatic coupler. In the piston 6 a series of openings 65 (FIG. 4) is provided in some of which is inserted plunger pins 9 having two-way grooves 10 of variable section to control the flow of hydraulic pressure fluid from one portion or space S of the device to another portion or space Sa. The plunger pins 9 are freely mounted in the openings 65 of the piston 6. The axial movement of the pins is limited by the inner walls of the base 2 and cover 3. The other openings of the piston 6 are covered by return valves 11 and elongated stems 12 thereof interact in the initial position with the cover 3 which allows the valves to be retained in the open position. A safety valve is also built in the piston, such as in FIG. 5.

Return spring 13 which serves to return the piston 6 to the initial position interact by means of one of its ends with the socket member 5 and by the other with the shoulder of a liner 14 mounted on the end of the rod 7. On the liner 14 there is also a circular projection 15 which thrusts against an additional resilient member formed by a set of disc springs 16 mounted on pin 17. This arrangement prevents closing of the device when the train starts off smoothly and when it moves along a protracted climb.

In the rod 7 there is a bore 18 in which an additional piston 19 moves and such piston is affected by spring 20 surrounding stop 21 fastened by threads 22 to the rod. The bore 18 is connected by channel 23 to low pressure space S of the hydraulic cylinder.

The absorbing device is also provided with a number of cup packings 24 for preventing fluid leakage. For relieving packings 24 from the pressure of the effective fluid in the high pressure space Sa there is a circular groove 25 in the base 2 which is connected by channel 26 with the low pressure space S and forms a hydraulic compaction.

The absorbing device shown in FIG. 2 provided with two successively positioned hydraulic chambers is mounted in cylinder body 27 having a base 28 at one end and a cover 29 at the other end fastened by bolts 30 to the body 27. In the middle part of the body 27 there is formed a circular groove for gasket ring 31 preventing movement of dividing washer 32 provided with an integral guide sleeve 33. The washer separates front 34 and rear 35 hydraulic chambers. Piston 36 in the front hydraulic chamber is integral with rod 37 and coacts with rod 38 of the rear hydraulic chamber.

The rod 38 is provided with a bore for an additional piston 39 biased by spring 40. In the body of rod 38 are channels 41 connecting the bore of the rod 38 with the low pressure space S' of the rear hydraulic chamber 35. The lower open end of the rod 38 is closed by a screw cap 62. Working springs 43 and 44 and disc springs 45 and 46 are positioned within chambers 34 and 35, respectively. In the hydraulic chamber 35 there is a headed stop 47 and in the hydraulic chamber 34 a thrust washer 48. Plunger pins 49 positioned along the periphery of the pistons alongside openings 50 of variable depth, have stems 51 of cross-shaped section. Safety valves as illustrated in FIG. 5 are also built into the piston 36 and piston 52 of the rear chamber 35. Each safety valve includes a spherule 53, an intermediate sleeve 54, a spring 55 and a plug 56.

Figure 10:
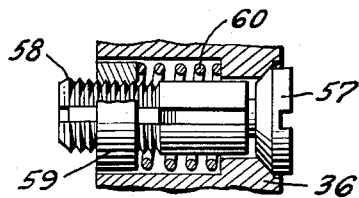
FIG. 10 is a view similar to FIG. 9 at the middle and parts of the power stroke as well as the return stroke.

Return valves 57 shown in detail in FIGS. 9 and 10 are provided with elongated stems 58 on which rings 59 for fixing pressure springs 60 are tightly threaded.

Channels 61 and 62 closed by plugs 63 and 64 are provided for the additional introduction of effective fluid into the absorbing device.

Figure 8:
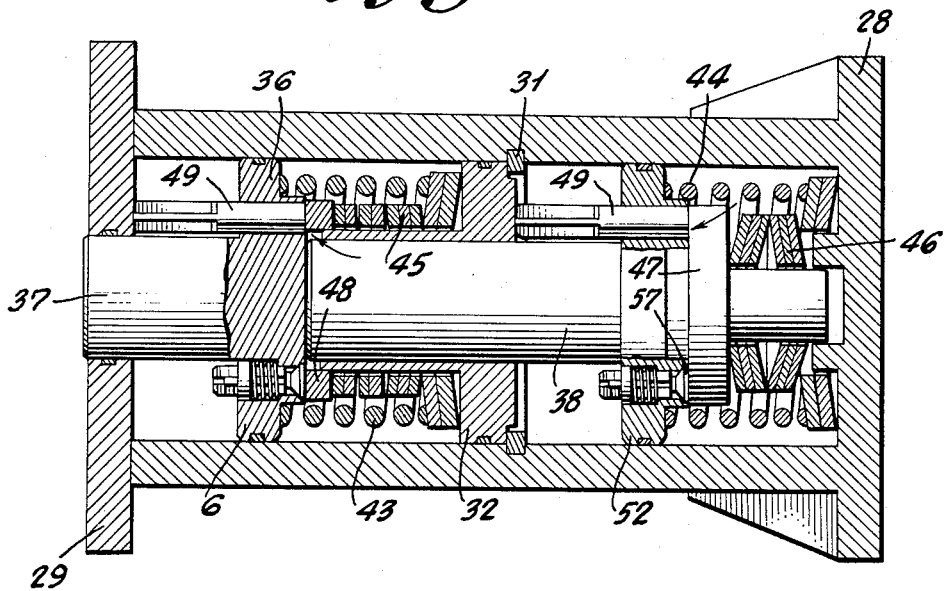
FIG. 8 is a view similar to FIG. 6 at the end of the power stroke.

The mode of operation of the absorbing device shown in FIG. 2 will best be understood by reference to FIGS. 6–8. In the initial position illustrated in FIG. 6, the rods 37 and 38 are urged to the extreme left hand position by the action of the springs 43 and 44. The valves 57 are opened as the stems 58 are pressed against the cover 29 and the washer 32.

When the free or outer end of the rod 37 is affected by the external load such as the starting of the rolling stock, the rods 37 and 38 together with the pistons 36 and 52 start their movement to the right. At the initial period of movement, the butt ends of the stems 58 are still pressed against the cover 29 and the washer 32, respectively, and the cylindrical parts of the plunger pins 49 have not yet covered the outflow openings of the pistons. Hence, the effective fluid may flow comparatively freely from the high-pressure spaces Sa' to the low-pressure spaces S' and the effort on the rod 37 will be determined only by the total rigidity of the springs 43 and 44. With further movement of the rods as disclosed in FIG. 7, the coaction between the stems of the valves 57, the cover 29 and the washer 32 ceases. As a result thereof, the valves close under the action of the fluid pressure and the action of the springs 60. The cylindrical parts of the plunger pins 49 cover the outflow openings in the pistons. Thus, overflow of the effective fluid from the high-pressure spaces into the low-pressure spaces will take place only through the openings 50 of the plunger pins 49 which will cause heavy throttling and, depending upon the speed of the piston movement, a more or less considerable gradient of pressure. At the expense of the above, a part of the consumed kinetic energy will be transformed into thermal energy being spent on heating the effective fluid.

At the end of the power stroke as shown in FIG. 8, the heads of the valves 57 come into contact with the step 47 and the thrust washer 48, respectively, and the disc springs 45 and 46 begin to function.

At the return stroke effected by the springs 43 and 44 which were compressed during the power stroke, the valves 57 open which ensures a rapid return of the movable parts of the device into their initial position. When operating under design conditions (e.g. in the course of shunting and train operation), the performance graph of the device has approximately a rectangular shape. FIG. 11 represents a diagram of hydraulic resistance change for one of the design alternatives of the device relating to the case of simultaneous jerking of two cars weighing 84 tons each. Here, the line $a$ represents the character of change of relative velocity V of the pistons or cylinders depending upon the stroke of the piston S. The line $b$ illustrates the law of the change of hydraulic resistance Q. Over the initial period of work (section O–I), the velocity V is practically constant. At the point I the hydraulic resistance rises proportionally to the rate of closure of the section of the return valves 57 and plunger pins 49. When the valves 57 are closed, the velocity begins to drop and as the sectional area of the outflow slots of the plunger pins 49 continues to decrease the resistance Q remains constant. At the end of the stroke (section II–III) the disc springs 45 and 46 begin to work and take the load.

When starting and moving over a long gradient, where the rate of loading the members of the automatic coupler is comparatively low, the hydraulic resistance which is proportional to the square of the velocity of the relative movement of the piston and cylinder is practically negligible. In this case, besides the springs 43 and 44 which at the end of the power stroke possess comparatively low rigidity, the disc springs 45 and 46 damping the shocks at the start of train movement begin to function.

When the rolling stock starts off very abruptly and when the device is in operation, the pressure in the spaces of the hydraulic cylinders may considerably increase which may be dangerous for the strength of the members of the device. Such increase in pressure is eliminated due to the presence of safety valves and the springs 55 which are adjusted to provide outflow of the effective fluid when the pressure exceeds the permissible limits. Simultaneously, as a result of the foregoing, the external characteristic of the device is automatically softened.

When the rod 38 moves, the volume of the chamber 35 changes and the excess of effective fluid will run along the channel 41 into the bore of the rod 38 thereby overcoming the resistance of the spring 40 for the piston 39. This piston may be simultaneously used for compensating the loss of effective fluid in the cylinder cavity.

The working cycle of the absorbing device disclosed in FIG. 1 does not differ substantially from the working cycle of the device above described. However, the bore 18 of the rod 7 is used only for compensating for the leakage from the hydraulic cylinder as the movement of the rod does not have any effect on the volume of the internal cavity of the cylinder. The connecting channel 26 and the circular groove 25 provide for relief of the packagings 24 from the high pressure developed in the cavity of the cylinder during the power stroke.

It should be noted that the invention provides effective operation of the device under various operating conditions. Repeated shocks of comparatively low force occurring during the train movement are considerably damped by the basic working spring before the additional high pressure chamber comes into action. The energy of the shocks both during the power stroke and the return stroke is mostly dissipated due to the hydraulic resistances when the effective fluid flows through the outflow openings and slots. Heavy loads, both impact and comparatively slowly increasing loads, are taken up by the additional disc springs. Thus, the members of the automatic couplers and frames of the rolling stock are prevented from failure, both because of fatigue due to the action of repeated alternating loads, and the action of loads causing stresses exceeding the static strength of the material of these members. Thus, it is possible to increase the operating life of the rolling stock and its working weight, as well as the speed of shunting operations without any strengthening of the frames of cars and without any damage to the goods carried.

The invention is not to be confined to any strict conformity to the showings in the drawings, but changes or modifications may be made therein so long as such changes or modifications mark no material departure from the spirit and scope of the appended claims.

What we claim is:

1. A hydraulic spring-actuated absorbing device for absorbing kinetic energy of bodies being in relative motion and particularly for automatic couplers for railway rolling stock, comprising means constituting a fluid cylinder, a base and cover for the cylinder, a piston within the cylinder providing first and second spaces, rod means secured to the piston and having a portion extending through and beyond the cover adapted to take the load from the coupler, spring means biased between the base and the rod means for returning said piston to its initial position, said piston having openings therein for fluid flow between said first and second spaces, plunger pins freely mounted in certain of the openings in the piston and including means for controlling fluid flow between said first and second spaces, return valves mounted in the other of the openings in the piston and which are open at the initial position of the piston, and additional spring means biased between the base and rod including disc springs adapted to be compressed by the rod on the power stroke of the piston, the arrangement being such that when a load is initially applied to the extending portion of the rod, the rod and piston are displaced axially of the cylinder in the direction of the base and the fluid freely flows from the ssecond space to the first space via the plunger pins and open return valves and upon further axial movement, the return valves close and flow from the second space to the first space is via the plunger pins causing heavy throttling while at the end of the power stroke the spring means and disc springs are compressed while on the return stroke, the return valves open thereby assuring a rapid return of the rod and piston to their initial position by fluid flow from the first space to the second space via the valves and plungers.

2. The absorbing device as claimed in claim 1, in which said return valves each includes an elongated stem bearing against said cover at the initial position of said piston.

3. The absorbing device as claimed in claim 1, in which said plunger pins each includes a cylindrical rod provided with longitudinal slots of alternating section, with the axial movement of said rods being limited to the thrust against the cover and base.

4. The absorbing device as claimed in claim 1, further including safety valve means in said piston operative when pressure increases excessively during the power stroke of the piston.

5. A hydraulic spring-actuated absorbing device for absorbing kinetic energy of bodies being in relative motion and particularly for automatic couplers for railway rolling stock, comprising means constituting a fluid cylinder, a base and cover for the cylinder, a piston within the cylinder providing first and second spaces, rod means secured to the piston and having a portion extending through and beyond the cover adapted to take the load from the coupler, spring means biased between the base and the rod means for returning said piston to its initial position, said piston having openings therein for fluid flow between said first and second spaces, plunger pins freely mounted in certain of the openings in the piston and including means for controlling fluid flow between said first and second spaces, return valves mounted in the other of the openings in the piston and which are open at the initial position of the piston, additional spring means biased between the base and rod including disc springs adapted to be compressed by the rod on the power stroke of the piston, said rod having a longitudinally extending bore defining a compensating chamber for fluid, a further piston mounted in said bore, further spring means within said bore biasing said further piston, conduit means between said bore and first space, the arrangement being such that when a load is initially applied to the extending portion of the rod, the rod and piston are displaced axially of the cylinder in the direction of the base and the fluid freely flows from the second space to the first space via the plunger pins and open return valves and upon further axial movement, the return valves close and flow from the second space to the first space is via the plunger pins causing heavy throttling while at the end of the power stroke the spring means and disc springs are compressed while on the return stroke, the return valves open thereby assuring a rapid return of the rod and piston to their initial position by fluid flow from the first space to the second space via the valves and plungers and any excess fluid will enter said bore through said conduit means thus overcoming the action of the further spring means.

6. A hydraulic spring-actuated absorbing device for absorbing kinetic energy of bodies being in relative motion and particularly for automatic couplers for railway rolling stock, comprising means constituting a fluid cylinder, means dividing the cylinder into two superposed chambers, a base and a cover for said cylinder, a piston within each chamber providing first and second spaces therein, rod means secured to each piston and having a portion extending through and beyond the cover adapted to take the load from the coupler, first spring means biased between the dividing means and one piston, second spring means biased between the base and the other piston for returning said pistons to their initial position, each piston having openings therein for fluid flow between said first and second spaces, plunger pins freely mounted in certain of the openings in the pistons and including means for controlling fluid flow between said first and second spaces, return valves mounted in the other of the openings and which are open at the initial position of the piston, and additional spring means biased between the dividing means and the cover and the base and the rod including disc springs adapted to be compressed by the rod on the power stroke of the piston, the arrangement being such that when a load is initially applied to the extending portion of the rod, the rod and pistons are displaced axially of the chambers and the fluid flows freely from the second space to the first space via the plunger pins and open return valves and upon further axial movement, the return valves close and flow from the second space to the first space is via the plunger pins thus causing heavy throttling while at the other end of the power stroke the spring means and disc springs are compressed while on the return stroke, the return valves open thereby assuring a rapid return of the rod and pistons to their initial position by fluid flow through the open valves and plungers.

7. The absorbing device as claimed in claim 6, in which said rod is provided with a longitudinally extending bore defining a compensating chamber for fluid, a further piston mounted in said bore, spring means within said bore biasing said piston, and channel means between said bore and the first space of the lowermost chamber.

8. The absorbing device as claimed in claim 6, including safety valve means in each piston operative when pressure increases excessively during the power stroke of the pistons.

References Cited by the Examiner

UNITED STATES PATENTS

| | | | |
|---|---|---|---|
| 1,141,696 | 6/1915 | Fernanzo | 213—43 |
| 1,955,349 | 4/1934 | Stevens | 213—43 |
| 2,816,670 | 12/1957 | Edwards et al. | 213—43 |
| 3,040,907 | 6/1962 | Pelabon | 213—43 |

ARTHUR L. LA POINT, *Primary Examiner.*

LEO QUACKENBUSH, *Examiner.*